US012699291B2

(12) United States Patent
Steinberg et al.

(10) Patent No.: US 12,699,291 B2
(45) Date of Patent: Aug. 4, 2026

(54) COMPACT DIFFERENTIAL TRAVELING WAVE ELECTRO-ABSORPTION MODULATOR FOR HIGH BANDWIDTH OPERATION

(71) Applicant: Mellanox Technologies, Ltd., Yokneam (IL)

(72) Inventors: Oren Steinberg, Tel Shahar (IL); Moshe B. Oron, Rehovot (IL); Isabelle Cestier, Haifa (IL); Elad Mentovich, Tel Aviv (IL); Timothy De Keulenaer, Ghent (BE); Jochem Verbist, Edegem (BE)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 411 days.

(21) Appl. No.: 18/242,652

(22) Filed: Sep. 6, 2023

(65) Prior Publication Data

US 2025/0076690 A1 Mar. 6, 2025

(51) Int. Cl.
G02F 1/015 (2006.01)
G02F 1/025 (2006.01)
G02F 1/35 (2006.01)

(52) U.S. Cl.
CPC ............ G02F 1/0157 (2021.01); G02F 1/025 (2013.01); G02F 1/3505 (2021.01)

(58) Field of Classification Search
None
See application file for complete search history.

(56) References Cited

U.S. PATENT DOCUMENTS 6,597,011 B1 7/2003 Atanackovic
6,914,706 B2 7/2005 Ishimura
(Continued)

FOREIGN PATENT DOCUMENTS

CN 108563041 A 9/2018
EP 3462232 B1 9/2017
WO WO-2020149953 A1 * 7/2020 ........... G06N 3/0675

OTHER PUBLICATIONS

Islam et al, "Very low input voltage cascaded travelling wave electroabsorption modulator (CTWEAM) for more than 100 Gbps," Optics Communications, vol. 297, pp. 43-47 (Year: 2013).
(Continued)

*Primary Examiner* — Kristy A Haupt
(74) *Attorney, Agent, or Firm* — ALSTON & BIRD LLP

(57) ABSTRACT

Systems and methods are described herein for an electro-absorption modulator (EAM) device. An example EAM device comprises an optical waveguide comprising a waveguide core configured to facilitate propagation and modulation of an optical signal therethrough; a segmented structure comprising diode segments disposed on the waveguide; and an electrical transmission line operatively coupled to the diode segments. The electrical transmission line is configured to facilitate propagation of an electrical signal therethrough. The electrical transmission line includes a first transmission line rail and a second transmission line, where a first subset of diode segments is operatively coupled to the first transmission line rail and a ground rail, and a second subset of diode segments is operatively coupled to the second transmission line and the ground rail. The diode segments from the first subset are disposed alternately with the diode segments from the second subset.

24 Claims, 8 Drawing Sheets

(56) References Cited

U.S. PATENT DOCUMENTS

| | | | |
|---|---|---|---|
| 7,010,179 B2 | 3/2006 | Hatta et al. | |
| 9,142,698 B1 * | 9/2015 | Cunningham | G02F 1/025 |
| 9,952,456 B2 | 4/2018 | Huang | |
| 11,855,700 B2 | 12/2023 | Oron et al. | |
| 11,886,055 B2 | 1/2024 | Mentovich et al. | |
| 2003/0147574 A1 | 8/2003 | Lam et al. | |
| 2007/0009195 A1 | 1/2007 | Eriksson et al. | |
| 2008/0170821 A1 | 7/2008 | Kissa et al. | |
| 2009/0297088 A1 | 12/2009 | Koh | |
| 2016/0119062 A1 | 4/2016 | Christensen | |
| 2016/0349541 A1 | 12/2016 | Velthaus et al. | |
| 2018/0129082 A1 | 5/2018 | Lin et al. | |
| 2019/0187495 A1 * | 6/2019 | Melikyan | G02F 1/015 |
| 2021/0226409 A1 * | 7/2021 | Grillanda | G02F 1/017 |
| 2023/0127711 A1 | 4/2023 | Maglio et al. | |
| 2023/0221588 A1 | 7/2023 | Oron et al. | |
| 2024/0027706 A1 | 1/2024 | Tadayon et al. | |

OTHER PUBLICATIONS

Li et al, "GeSi modulator based on two-mode interference," Applied Optics, vol. 53, No. 2, pp. 221-225 (Year: 2014).

Hasebe et al, "Push-pull driven electro-absorption modulator integrated with DFB laser using selectively doped lateral pin diode structure," IEEE International Semiconductor Laser Conference, pp. 54-55 (Year: 2014).

Oron et al., Pending U.S. Appl. No. 18/120,802, filed Mar. 13, 2023.

Steinberg et al., Pending U.S. Appl. No. 18/120,719, filed Mar. 13, 2023.

* cited by examiner

700

RECEIVING, FROM A LASER SOURCE, A CONTINUOUS WAVE (CW) LIGHT VIA AN OPTICAL WAVEGUIDE, WHEREIN THE OPTICAL WAVEGUIDE COMPRISES A SEGMENTED STRUCTURE COMPRISING DIODE SEGMENTS DISPOSED THEREON
702

RECEIVING, FROM A RADIO FREQUENCY (RF) SOURCE, AN ELECTRICAL SIGNAL VIA AN ELECTRICAL TRANSMISSION LINE, WHEREIN THE ELECTRICAL TRANSMISSION LINE COMPRISES A FIRST TRANSMISSION RAIL AND A SECOND TRANSMISSION RAIL, WHEREIN A FIRST SUBSET OF DIODE SEGMENTS IS OPERATIVELY COUPLED TO THE FIRST TRANSMISSION RAIL AND A GROUND RAIL, AND A SECOND SUBSET OF DIODE SEGMENTS IS OPERATIVELY COUPLED TO THE SECOND TRANSMISSION LINE AND THE GROUND RAIL
704

GENERATING, USING THE EAM DEVICE, AN OPTICAL OUTPUT SIGNAL BASED ON AT LEAST MODULATING THE CW LIGHT
706

TRANSMITTING THE OPTICAL OUTPUT SIGNAL VIA THE OPTICAL WAVEGUIDE TO AN EXTERNAL OPTICAL FIBER
708

FIGURE 7

COMPACT DIFFERENTIAL TRAVELING WAVE ELECTRO-ABSORPTION MODULATOR FOR HIGH BANDWIDTH OPERATION

TECHNOLOGICAL FIELD

Example embodiments of the present disclosure relate to traveling wave electro-absorption modulators (TW-EAM) and, more particularly, to a compact differential TW-EAM (CD-TWEAM) design for high bandwidth operation.

BACKGROUND

Next generation optical links, such as XDR optical links at 200 Gigabits per second (Gbps) and GDR optical links at 400 Gbps are often used in large networks, such as those in the telecommunications and data center industries, where the data needs to be transferred quickly and securely. As the need for larger and faster application clusters and cores increases, so does the demand for high data rate interconnects at low power.

Applicant has identified a number of deficiencies and problems associated with current designs of optical modulators for high bandwidth operation. Many of these identified problems have been solved by developing solutions that are included in embodiments of the present disclosure, many examples of which are described in detail herein.

BRIEF SUMMARY

Systems and methods are provided for compact differential traveling wave electro-absorption modulators (CD-TWEAM) formed on a semiconductor chip for high bandwidth operation.

In one aspect, an electro-absorption modulator (EAM) device is presented. The device comprising: an optical waveguide comprising a waveguide core configured to facilitate propagation and modulation of an optical signal therethrough; a segmented structure comprising diode segments disposed on the waveguide; and an electrical transmission line operatively coupled to the diode segments, wherein the electrical transmission line is configured to facilitate propagation of an electrical signal therethrough, wherein the electrical transmission line comprises a first transmission line rail and a second transmission line rail, wherein a first subset of diode segments is operatively coupled to the first transmission line rail and a ground rail, and a second subset of diode segments is operatively coupled to the second transmission line rail and the ground rail, wherein the diode segments from the first subset are disposed alternately with the diode segments from the second subset.

In some embodiments, the electrical transmission line is a differential electrical transmission line.

In some embodiments, an impedance associated with the differential electrical transmission line, when unloaded, is within a range of approximately 8052 to approximately 15052.

In some embodiments, the electrical transmission line is a co-planar dual strip-line (CPS) transmission line.

In some embodiments, the CPS transmission line has at least one of (i) a signal-ground-signal (SGS) configuration, (ii) a ground-signal-signal-ground (GSSG) configuration, or (iii) a ground-signal-ground-signal-ground (GSGSG) configuration.

In some embodiments, the EAM device is formed on a planar semi-insulating substrate.

In some embodiments, the planar semi-insulating substrate comprises a plurality of isolated pockets of conducting n-type semiconductor layers.

In some embodiments, the plurality of isolated pockets of conducting n-type semiconductor layers in the planar semi-insulating substrate are formed by at least one of (i) selective implantation of donor ions in the planar semi-insulating substrate, (ii), selective implantation of insulation promoting ions (such as Fe ions) in an epitaxial n-type Indium Phosphide (InP) layer, (iii) epitaxial regrowth of the n-type InP layer inside chemically etched wells in the planar semi-insulating substrate, or (iv) epitaxial regrowth of a semi-insulating InP layer inside chemically etched wells in an n-type InP layer grown on the planar semi-insulating substrate.

In some embodiments, the optical waveguide comprises at least a ridge waveguide or a buried heterostructure (BH) waveguide.

In some embodiments, the first transmission line rail is operatively coupled to a first electrode of each diode in the first subset of diode segments, and the second transmission line rail is operatively coupled to a second electrode of each diode segment in the second subset of diode segments.

In some embodiments, the ground rail is disposed between the first transmission line rail and the second transmission line rail.

In some embodiments, an output end of the electrical transmission line is operatively coupled to a termination load.

In some embodiments, the first transmission line rail is disposed along a first side of the waveguide core, and the second transmission line rail is disposed along a second side of the waveguide core.

In some embodiments, the diode segments are disposed on the optical waveguide along the electrical transmission line and are configured to create discrete capacitive loads on the electrical transmission line.

In some embodiments, the EAM device is configured for operation by a radio frequency (RF) source, wherein the RF source is configured to supply the electrical signal to the EAM device.

In some embodiments, the RF source is directly coupled to an input end of the electrical transmission line without an intermediate single-ended driver circuit.

In some embodiments, the RF source is a differential signal source comprising a differential signal port, wherein the differential signal port is operatively coupled to an input end of the electrical transmission line.

In some embodiments, the RF source is a Serializer-Deserializer (SerDes) transmitter.

In some embodiments, the optical waveguide comprises alternating active sections and passive sections, wherein each diode segment is disposed on a corresponding active section.

In some embodiments, the waveguide core comprises a continuous multi-quantum well (MQW) layer stack, wherein portions of the MQW layer stack disposed in the active sections have an energy gap defining an active energy gap value, and portions of the MQW layer stack disposed in the passive sections have an energy gap defining a passive energy gap value, wherein the passive energy gap value is greater than or equal to the active energy gap value to maintain low insertion loss.

In some embodiments, the EAM device is monolithically integrated with a laser source on a same chip.

In some embodiments, the diode segments and the electrical transmission line are configured to provide velocity matching between the electrical signal and the optical signal.

In another aspect, a method of generating an optical output signal using an electro-absorption modulator (EAM) device is presented. The method comprising: receiving, from a laser source, a continuous wave (CW) light via an optical waveguide, wherein the optical waveguide comprises a segmented structure comprising diode segments disposed thereon; receiving, from a radio frequency (RF) source, an electrical signal via an electrical transmission line, wherein the electrical transmission line comprises a first transmission line rail and a second transmission line rail, wherein a first subset of diode segments is operatively coupled to the first transmission line rail and a ground rail, and a second subset of diode segments is operatively coupled to the second transmission line and the ground rail; generating, using the EAM device, an optical output signal based on at least modulating the CW light; and transmitting the optical output signal via the optical waveguide to an external optical fiber.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made to the accompanying drawings. The components illustrated in the figures may or may not be present in certain embodiments described herein. Some embodiments may include fewer (or more) components than those shown in the figures.

Figure 1:
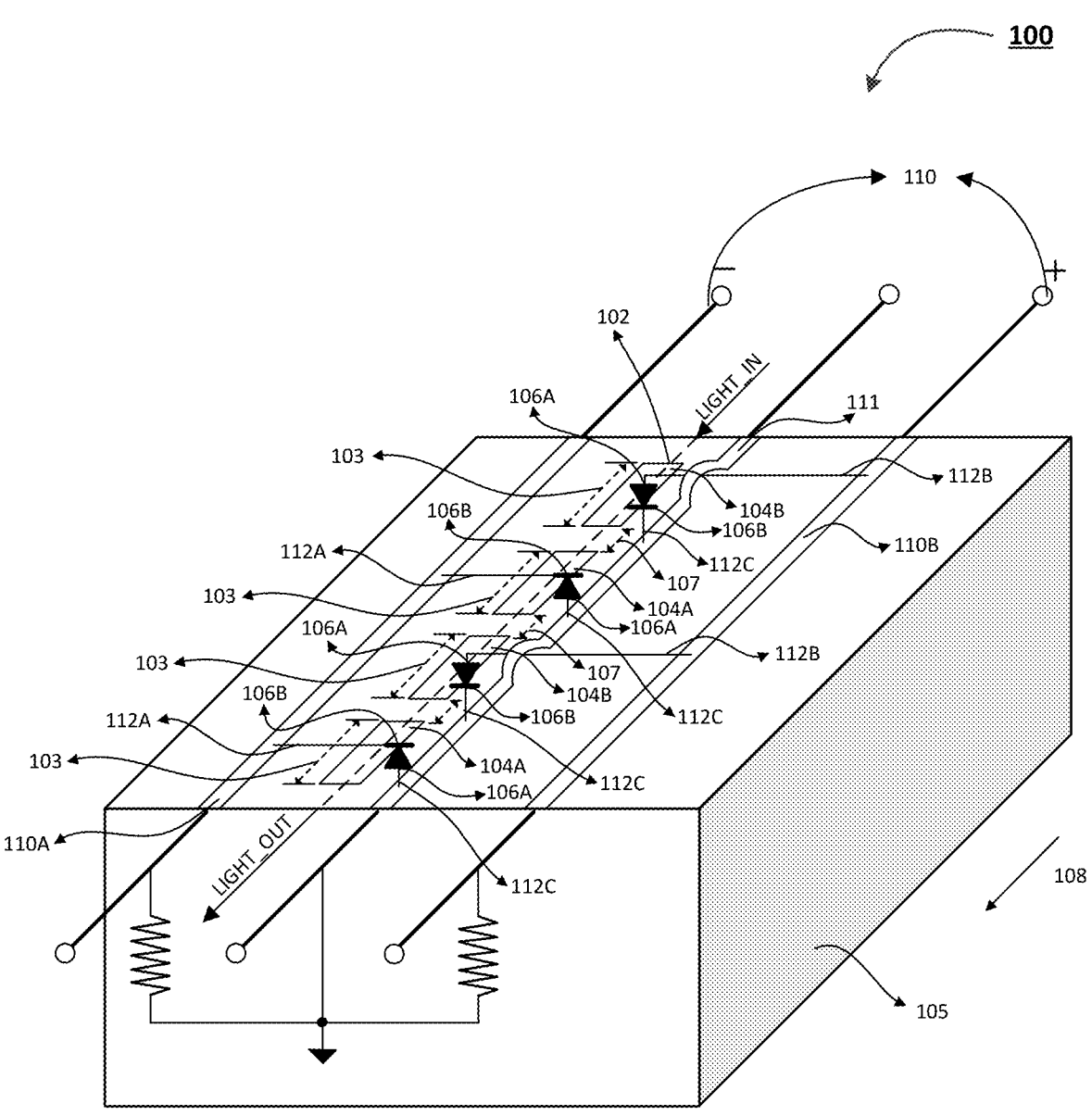
Figure 2:
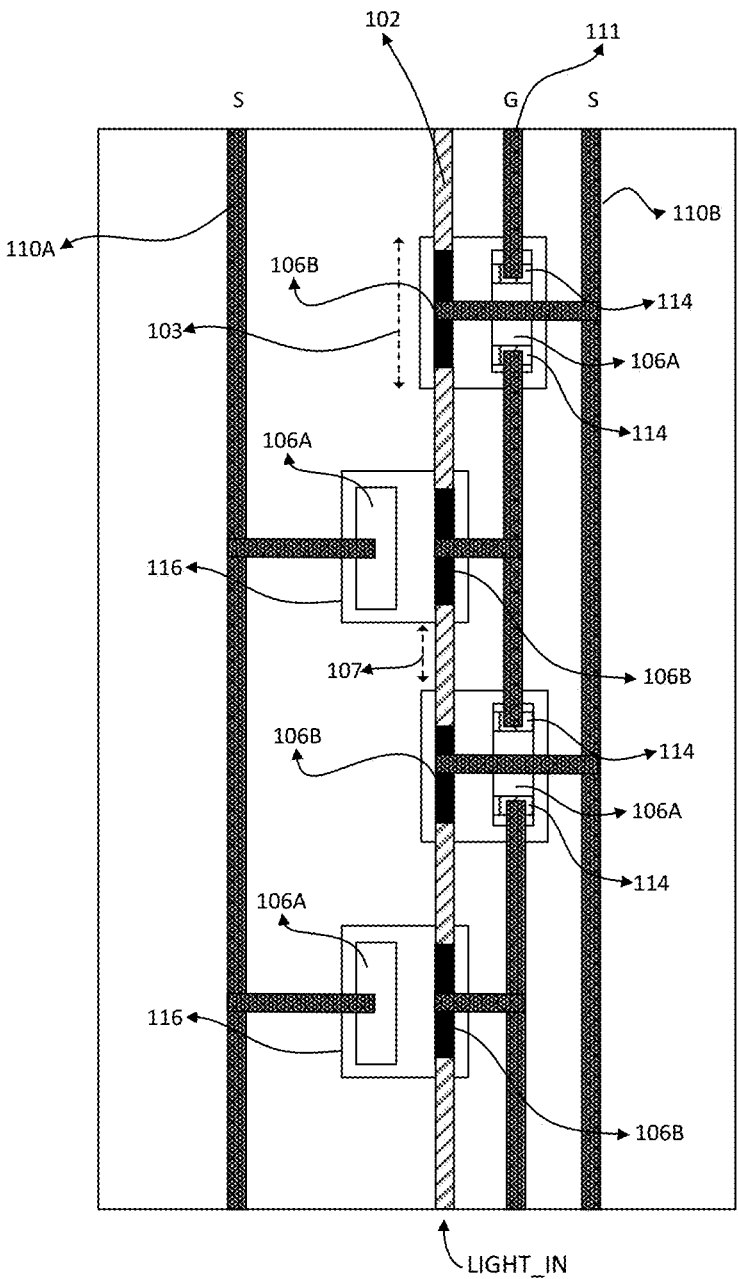
Figure 3A:
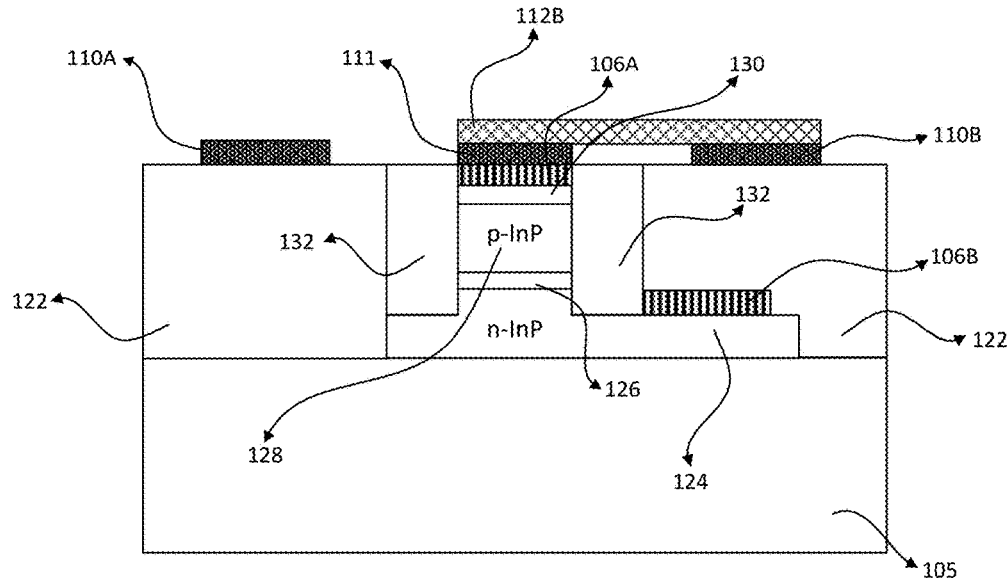
Figure 3B:
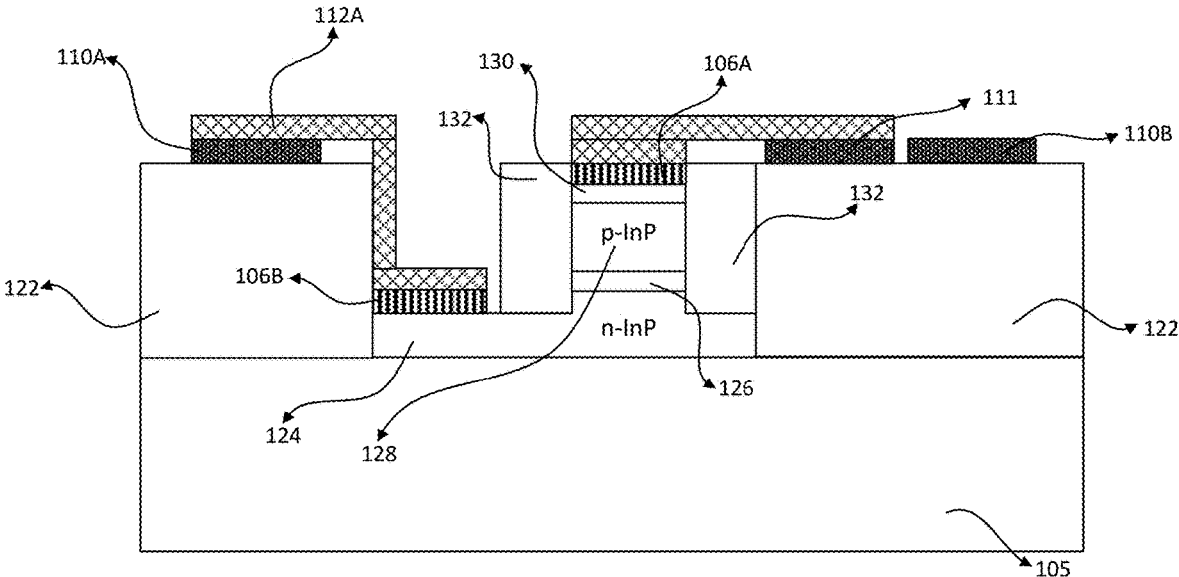
Figure 4:
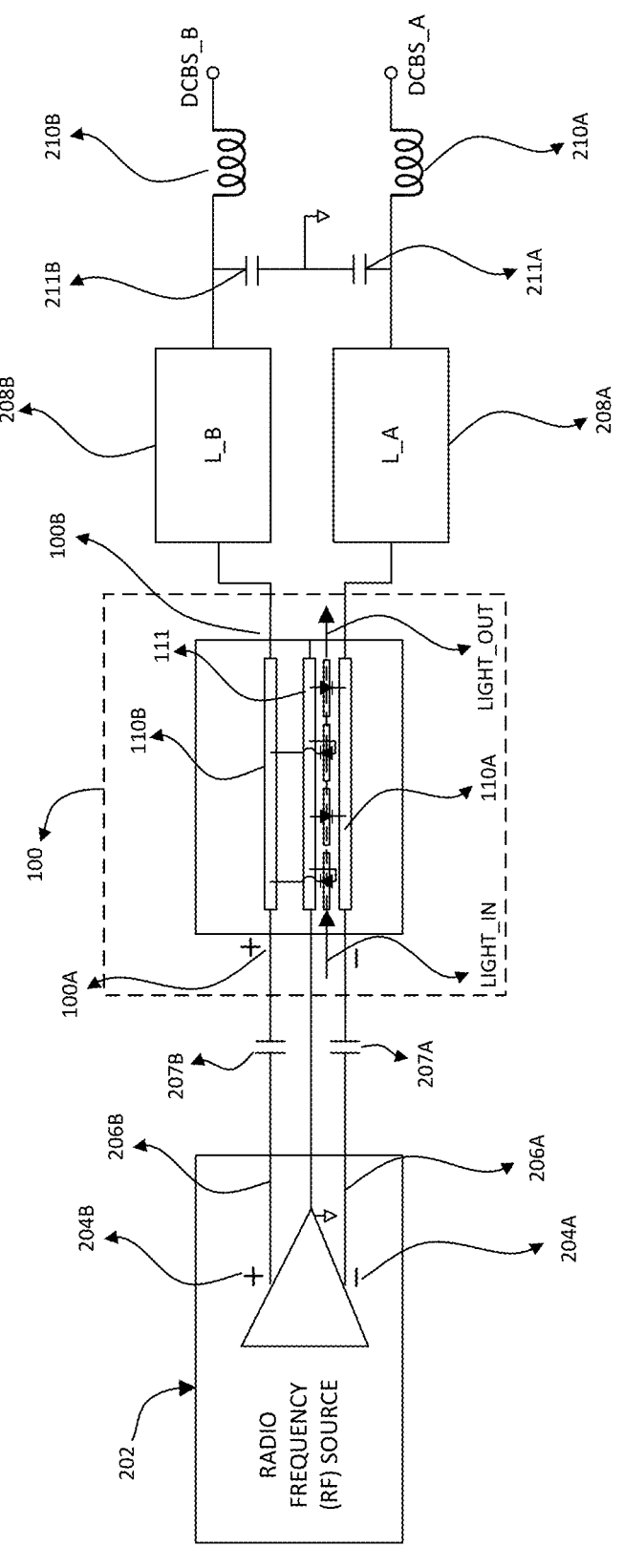
Figure 5A:
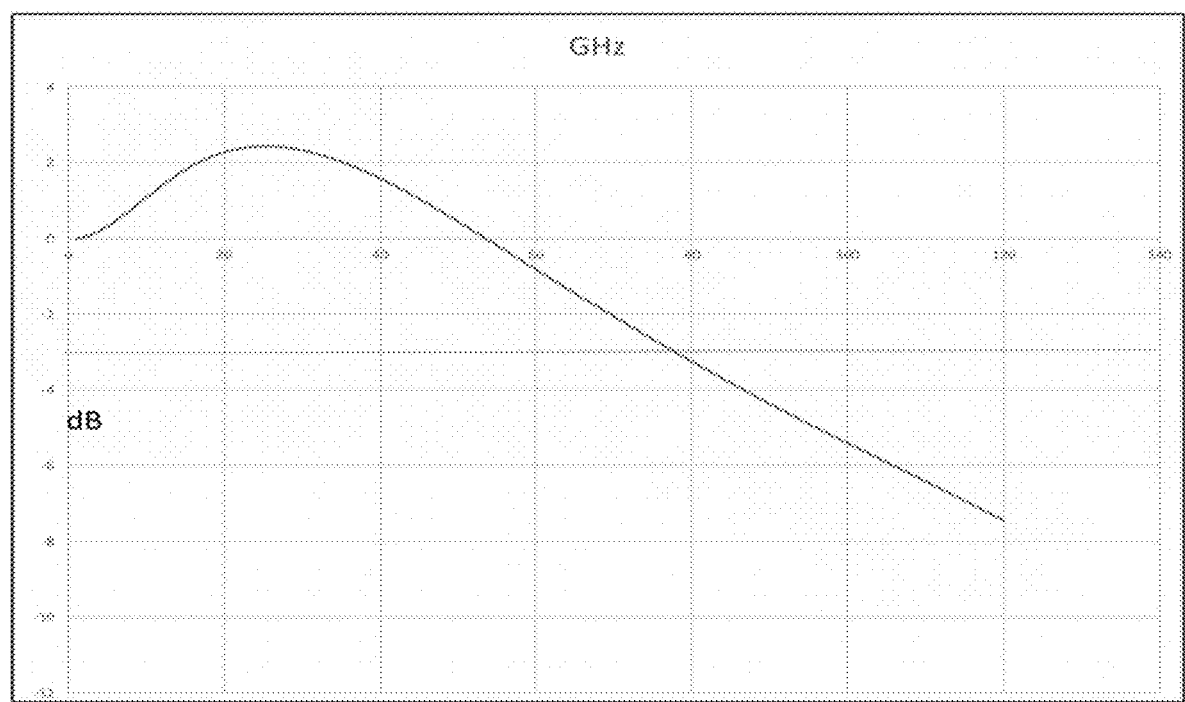
Figure 5B:
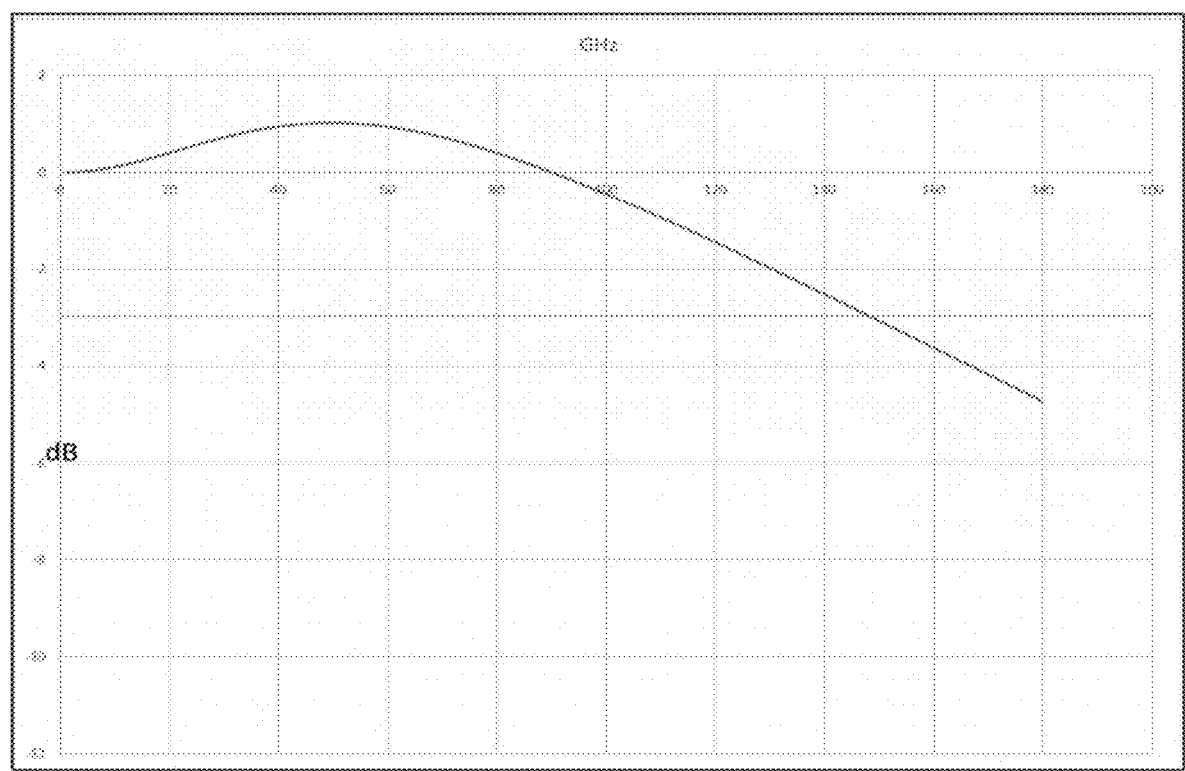
Figures 6A, 6B, 6C, 6D:
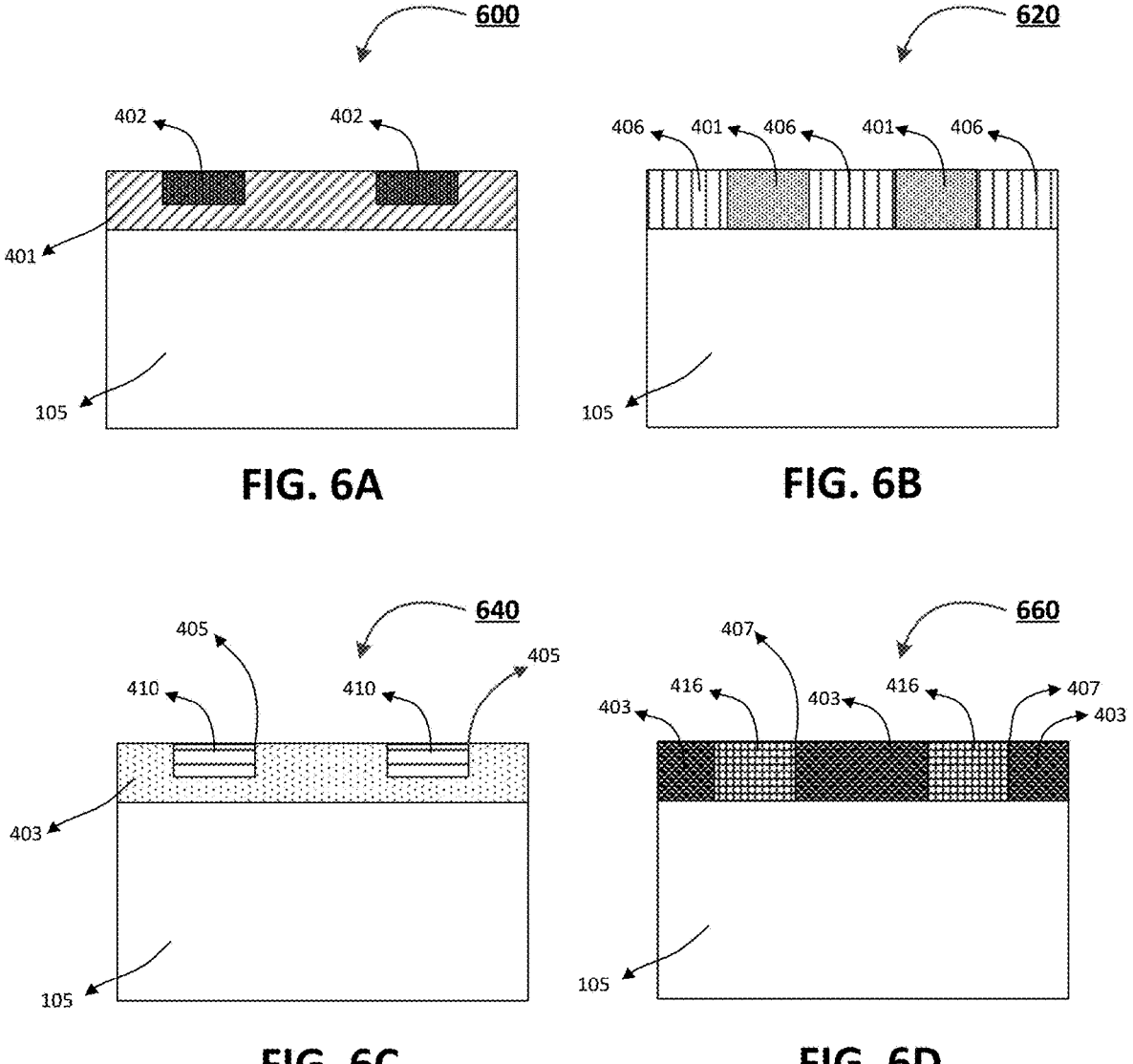

FIG. 1 illustrates a perspective view of an example compact differential traveling wave electro-absorption modulator (CD-TWEAM) device formed on a semiconductor chip, in accordance with an embodiment of the invention;

FIG. 2 illustrates a top view of the example CD-TWEAM device 100 shown in FIG. 1, in accordance with an embodiment of the invention;

FIGS. 3A-3B illustrates a partial cross-sectional view of the example CD-TWEAM device shown in FIG. 1, in accordance with an embodiment of the invention;

FIG. 4 illustrates a CD-TWEAM device operatively coupled to an RF source, in accordance with an embodiment of the invention;

FIG. 5A illustrates a simulated frequency response curve for a single-ended lumped element EAM device with an active modulator length of 80 microns;

FIG. 5B illustrates a simulated frequency response curve for a CD-TWEAM device with four electrode segments, with each electrode segment having an active modulator length of 20 microns, in accordance with an embodiment of the invention;

FIG. 6A illustrates an example formation of isolated pockets of conducting n-type material in a planar SI substrate using selective ion implantation of n-type dopant (e.g. silicon) inside the semi-insulating (SI) InP layer, in accordance with an embodiment of the invention;

FIG. 6B illustrates an example formation of isolated regions of conducting n-type semiconductor layers in a planar SI substrate using selective implantation of isolation promoting ions, in accordance with an embodiment of the invention;

FIG. 6C illustrates an example formation of isolated pockets of conducting n-type semiconductor layers in a planar semi-insulating substrate using epitaxial regrowth of the n-type InP layer inside chemically etched wells in the planar SI InP layer, in accordance with an embodiment of the invention;

FIG. 6D illustrates an example formation of isolated pockets of conducting n-type semiconductor layers in a planar SI substrate using epitaxial regrowth of a semi-insulating InP layer inside chemically etched wells in an n-type InP layer grown on the planar semi-insulating substrate, in accordance with an embodiment of the invention; and FIG. 7 illustrates a method for generating an optical output signal using a CD-TWEAM device, in accordance with an embodiment of the invention.

DETAILED DESCRIPTION

Overview

Next generation optical links, such as XDR optical links and GDR optical links, are used in large networks, where the data needs to be transferred quickly and securely. Transmitters for these optical links convert an electrical signal input into an optical signal that is then transmitted through the optical fiber. In next generation optical transmitters capable of data transmission at high bit rates, externally modulated semiconductor lasers are of high interest because of their potential for high bandwidth operation. External modulators, such as Indium Phosphide (InP) based electro-absorption modulators (EAMs), have often been used for such purposes because they can be monolithically integrated on the same semiconductor chip with a continuous wave (CW) semiconductor light source, such as a laser. The resulting InP based integrated electro-absorption modulated lasers (EMLs) have inherently lower coupling losses, lower power consumption, and lower cost as compared to other hybrid solutions. For example, InP based EMLs are often used in large data centers where a large number of optical modulating devices are employed for operation.

In large data centers, digital data is managed by electrical radio frequency (RF) circuitry that uses multiple serializer-deserializer (SerDes) components operating at high bit rates. The SerDes transmitters use differential RF signaling for driving links made with either copper wires or optical fibers. In a SerDes transmitter, differential RF signaling allows for double signal voltage, common mode and supply noise rejection, improved non-linearity, and the potential for high bandwidth operations. A differential input EAM may be used to directly interface with the SerDes transmitter to make full use of the RF power generated by the differential signal output ports of the SerDes transmitter.

The bandwidth, and therefore the performance, of a lumped element EAM is inherently constrained by the relationship $\frac{1}{2}\pi RC$, where 'R' is the load resistance and 'C' is the junction capacitance. A differential driver typically has an impedance (e.g., 80Ω-100Ω) that is twice that of a single-ended driver (e.g., 40Ω-50Ω). This doubled impedance may contribute to the RC limitation, potentially causing the frequency response to deteriorate. To overcome this limitation, embodiments of the present invention use a traveling wave (TW) differential EAM instead of a lumped element EAM. In a TW differential EAM design, operational bandwidth may be increased by distributing the capacitance of the modulator as discrete loads along an electrical transmission line. Accordingly, embodiments of the present invention introduce an EAM that includes a number of segmented diodes arranged in-line along the axis of the optical waveguide. Furthermore, the segmented diodes are divided into two subsets. The first subset of segmented diodes may be connected between a first transmission line rail of the differential electrical transmission line and a ground rail. For example, the cathodes of the first subset of segmented diodes may be connected to the first transmission line rail and the anodes of the first subset of the segmented diodes may be connected to the ground rail. The second subset of the segmented diodes may be connected between a second transmission line rail of the differential electrical transmission line and the ground rail. For example, the anodes of the second subset of segmented diodes may be connected to the second transmission line rail and the cathodes of the second subset of segmented diodes may be connected to the ground rail. According to this example, the segmented diodes of the first subset and the segmented diodes of the second subset are arranged alternately along the axis of the optical waveguide.

InP based conventional EAMs are typically implemented on n-type InP substrates. In such devices, the cathodes of the EAM diodes and the cathodes of the laser diode are operatively coupled to the n-type substrate. For a CD-TWEAM, the cathodes of the segmented diodes cannot be connected or coupled to the conductive substrate as it may result in shorting or high capacitance to ground. To overcome such a limitation, embodiments of the present invention use an EAM implemented on a semi-insulating (SI) substrate with multiple regions of electrically isolated n-type pockets. These n-type pockets may serve as underlying layers for the cathode electrode of each segmented diode. Furthermore, the n-type pockets may be enclosed by semi-insulating material, keeping the pockets electrically isolated from one another. This process forms a planar substrate that has specific regions that can conduct electricity (e.g., the n-type pockets) and other areas that insulate these conducting regions from each other. Once this planar substrate is prepared, the EAM or EML device can be built upon it, using standard techniques and processes that are common in the creation of these devices on conventional n-type substrate.

Embodiments of the present invention will now be described more fully hereinafter with reference to the accompanying drawings, in which some, but not all, embodiments are shown. Indeed, the present disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, terms such as "top," "about," "around," etc. are used for explanatory purposes in the examples provided below to describe the relative position of certain components or portions of components.

As used herein, the terms "substantially" and "approximately" refer to tolerances within appropriate manufacturing and/or engineering standards or limits.

As used herein, "operatively coupled" may mean that the components are electrically coupled and/or are in or are capable of electrical communication with one another, or are optically coupled and/or are in or are capable of optical communication with one another. Furthermore, "operatively coupled" may mean that the components may be formed integrally with each other or may be formed separately and coupled together. Furthermore, "operatively coupled" may mean that the components may be directly connected to each other or may be connected to each other with one or more components (e.g., connectors, capacitors, and/or the like) located between the components that are operatively coupled together. Furthermore, "operatively coupled" may mean that the components are detachable from each other or that they are permanently coupled together.

Example EAM Device

FIG. 1 illustrates a perspective view of an example compact differential traveling wave electro-absorption modulator (CD-TWEAM) device 100, in accordance with an embodiment of the invention. In an example embodiment, the CD-TWEAM device 100 may be monolithically integrated along with the laser source (not shown) and formed on a semiconductor chip (e.g., on and/or comprising a substrate) so as to provide an integrated semiconductor laser-modulator chip.

The CD-TWEAM device 100 may include an optical waveguide 102. In various embodiments, the optical waveguide 102 may include a ridge waveguide, a buried heterostructure (BH) waveguide, and/or the like. As shown in FIG. 1, the optical waveguide 102 may extend lengthwise in a modulator propagation direction 108. The optical waveguide 102 may include a continuous multiple quantum well (MQW) layer stack. In some embodiments, the MQW layer stack may be configured to transmit and/or propagate an optical beam and to modulate a continuous wave (CW) light propagating therethrough. For example, in various embodiments, the MQW layer stack may be configured to act as the waveguide core of the optical waveguide 102. The MQW layer stack may include a plurality of quantum wells. For example, the MQW layer stack may include a series of quantum wells disposed between a series of (quantum) barriers. In some embodiments, the MQW stack may be undoped and may form the intrinsic (i) part of the p-i-n junction.

In example embodiments, the MQW layer stack may be formed lengthwise in such a way that the optical waveguide 102 may include alternating active sections 103 and passive sections 107. Here, the modulation of the optical signal primarily occurs in the active sections 103 in response to the application of an electric field on the MQW stack in these sections. In some embodiments, the MQW material in the passive sections 107 may be the same as in the active sections 103. In some other embodiments, the MQW material in the passive sections 107 may be different from the MQW material in the active sections 103 due to special treatments during the production process, such as quantum well intermixing (QWI), quantum well disordering (QWD), selective area growth (SAG), etch and regrowth, and the like.

High performance EAMs in III-V material systems are based on Quantum Confined Stark Effect (QCSE). QCSE is a phenomenon in which the electro-optical properties of a semiconductor are affected by an external electric field. In such devices, the optical signal is modulated by an electrical field induced by an RF source into the MQW core of the optical waveguide 102 causing optical absorption of the optical wave propagating therethrough. The optical modulation is induced by an electric field in the intrinsic (i) volume of the p-i-n junction of the optical modulator, which is maintained under a reverse-bias voltage.

As shown in FIG. 1, in some embodiments, the CD-TWEAM device 100 may include an electrical transmission line 110 that may be configured to facilitate propagation of an electrical signal therethrough. In some embodiments, the electrical transmission line 110 may be a differential transmission line which includes a first transmission line rail 110A and a second transmission line rail 110B. As shown in FIG. 1, the first transmission line rail 110A may be disposed along a first side of the optical waveguide 102. The second transmission line rail 110B may be disposed along a second side of the optical waveguide 102. In example embodiments, when unloaded, an impedance associated with the differential electrical transmission line 110 may be within a range of about $80\Omega$ and $150\Omega$. In various embodiments, the electrical transmission line 110 may be designed in such a way that the discrete capacitive loads are configured to provide velocity matching between the electrical signal propagating through the electrical transmission line 110 and the optical signal propagating through the optical waveguide 102. In some embodiments, the electrical transmission line 110 may be a co-planar strip-line (CPS) transmission line. In some embodiments, the first transmission line rail 110A and the second transmission line rail 110B may be disposed on an organic material having a low dielectric constant, such as benzocyclobutene (BCB), as shown in FIGS. 3A-3B.

As shown in FIG. 1, the CD-TWEAM device 100 may include a ground rail 111 that may be configured as the zero-voltage reference point. In an example embodiment, as shown in FIG. 1, the first transmission line rail 110A, the second transmission line rail 110B, and the ground rail 111 may have a signal-ground-signal (SGS) configuration, where the ground rail 111 is disposed between the first transmission line rail 110A and the second transmission line rail 110B. Alternative embodiments, exemplified by the ground-signal-signal-ground (GSSG) configuration, the ground-signal-ground-signal-ground (GSGSG) configuration, and so forth, represent variations of the invention that, while not explicitly depicted, are fully contemplated and encompassed within the scope of this application. In some embodiments, the ground rail 111 may be disposed at least partially on an epitaxial n-type InP layer, and/or partially on an organic material having a low dielectric constant.

As shown in FIG. 1, the CD-TWEAM 100 may include a segmented structure comprising a first subset of diode segments 104A and a second subset of diode segments 104B. In some embodiments, the first subset of diode segments 104A and the second subset of diode segments 104B may be disposed on the active section 103 of the optical waveguide 102 along the electrical transmission line 110. As a result, the first subset of diode segments 104A and the second subset of diode segments 104B may create discrete capacitive loads on the electrical transmission line 110. In various embodiments, as shown in FIG. 1, the diode segments of the first subset of diode segments 104A may be disposed alternately with diode segments of the second subset of diode segments 104B, as shown in FIG. 1.

Each diode segment may include a first electrode 106B and a second electrode 106A. In example embodiments, the first electrode 106B may be a cathode and the second electrode 106A may be an anode. As shown in FIG. 1, the cathodes of each diode segment in the first subset of diode segments 104A may be operatively coupled to the first transmission line rail 110A, and the anodes of each diode segment in the first subset of diode segments 104A may be operatively coupled to the ground rail 111. Similarly, the cathodes of each diode segment in the second subset of diode segments 104B may be operatively coupled to the ground rail 111, and the anodes of each diode segment in the second subset of diode segments 104B may be operatively coupled to the second transmission line rail 110B.

In various embodiments, each diode segment may be operatively coupled to an electrical transmission line 110 via metal traces 112A-C providing electrical contacts. In particular embodiments, the first transmission line rail 110A may include a first set of metal traces 112A that are configured to provide an operative coupling (e.g., electrical contact) between the first electrode 106B of each diode segment in the first subset of diode segments 104A and the first transmission line rail 110A. Similarly, the second transmission line rail 110B may include a second set of metal traces 112B that are configured to provide an operative coupling between the second electrode 106A of each diode segment in the second subset of diode segments 104B and the second transmission line rail 110B. In addition, the ground rail 111 may include a third subset of metal traces 112C that are configured to provide an operative coupling between the second electrode 106A of each diode segment in the first subset of diode segments 104A and the ground rail 111, and an operative coupling between the first electrode 106B of each diode in the second subset of diode segments 104B and the ground rail 111. In various embodiments, the electrical transmission line 110 (including the ground rail 111), and the metal traces 112A-C may be formed of metal (e.g., gold, platinum, titanium, and/or the like) and/or another electrically conductive material.

In some embodiments, the CD-TWEAM device (e.g., CD-TWEAM device 100) may be implemented on an SI InP substrate 105. SI substrates are often used in the fabrication of semiconductor devices, such as high-frequency transistors, power devices, and optoelectronic devices. SI substrates have low electrical conductivity, high resistivity (e.g., typically higher than $10^7$ $\Omega$cm), and low free-carrier concentrations that may reduce parasitic effects caused by the presence of mobile electrons.

In some embodiments, the electrical transmission line 110 may be operatively coupled to an RF source that may be configured to supply an electrical signal (e.g., an output of a radio and/or microwave frequency system) to the CD-TWEAM device 100. The RF source may be any signal generator that has a differential output stage. For example, the RF source may be a signal generator (e.g., a digital/analog convertor (DAC), arbitrary waveform generator (AWG), local oscillator, and/or the like) configured to generate and/or provide a radio and/or microwave frequency electric signal. In some embodiments, the electrical signal supplied by the RF source (e.g., differential RF source as described in further detail below) may be efficiently provided to the diode segments via a differential transmission line on a dielectric carrier, which is coupled to the electrical transmission line 110 (e.g., the first transmission line rail 110A and the second transmission line rail 110B). The first transmission line rail 110A, the second transmission line rail 110B, and the ground rail 111 may be configured to have low resistance metal to reduce the amount of heat generated as the electrical signal propagates therethrough and maintain the integrity of (e.g., limit the noise introduced into) the electrical signal during propagation.

In some embodiments, the RF source may be a Serializer Deserializer (SerDes) transmitter configured to operate in a differential signaling mode. In differential signaling mode, two complementary voltage signals are transmitted via a pair of conductors from the SerDes transmitter. The pair of conductors carry voltage signals that are equal in magnitude, but of opposite polarity. Each conductor in the pair of conductors may provide a driving voltage of around 0.45V and a source impedance, Zs, that is within a range of about 40Ω to about 50Ω in reference to ground. Therefore, in differential signaling mode, the SerDes transmitter may provide an electrical signal that has a driving voltage, $V_{pp}$, of around 0.9V and a source impedance, Zs, that is within a range of about 80Ω to 100 Ω. The $V_{pp}$ provided by the SerDes transmitter operating in differential signaling mode is twice the $V_{pp}$ provided by the SerDes transmitter operating in a single-ended signaling mode. Similarly, the Zs provided by the SerDes transmitter operating in differential signaling mode is twice the Zs provided by the SerDes transmitter operating in single-ended signaling mode. As such, differential signaling mode allows for double the signal voltage, common mode, and supply noise rejection, as well as improved non-linearity and the potential for high bandwidth operations.

By arranging each diode segment of the first subset of diode segments 104A and the second subset of diode segments 104B alternately along the axis of the optical waveguide 102, embodiments of the present invention allow for cumulative combination of optical modulations of each diode segment along the length of the optical waveguide 102. This occurs provided the velocity of the RF wave matches the group velocity of the propagating signal. In conventional single-ended TW-EAMs, velocity matching and optimal bandwidth performance often necessitate the use of small filling factor (FF). As used herein, FF may be defined as the ratio of length of an active section to a sum of the lengths of active and passive sections, i.e., period length. While a small FF facilitates good velocity matching, it can result in a substantial increase in the total length of the modulator, thereby increasing the modulator's insertion loss. Embodiments of the present invention offer the advantage of enabling an increase in the filling factor without compromising performance. As a result, this facilitates the design of a more compact modulator, which effectively mitigates insertion loss and reduces power consumption.

Due to the lateral distance between the transmission line rails 110A and 110B, and their lateral separation from the ground rail 111, the interaction between transmission line rails 110A and 110B is minimal. As such, the transmission line rails 110A and 110B may be considered as two almost independent transmission line rails with respect to the ground rail 111, with each transmission line rail having half the filling factor of the full differential transmission line. The increase in the effective filling factor is a result of the alternating arrangement of the diode segments, as described herein. In an example embodiment, the filling factor of each nearly independent electrical transmission line (e.g., first transmission line rail 110A and second transmission line rail 110B with reference to ground) is 0.23, and the filling factor of the differential electrical transmission line (e.g., electrical transmission line 110) is 0.46.

FIG. 2 illustrates a top view of the example CD-TWEAM device 100 shown in FIG. 1, in accordance with an embodiment of the invention. As shown in FIG. 2, the metal traces for the transmission line rails 110A and 110B, and the interconnects to the diode segments, are situated on the upper surface of the SI substrate 105. In some embodiments, the transmission line rails 110A and 110B may be situated on either side of the optical waveguide 102. The connections to ground may be laterally directed, leading to a ground rail 111 located in close proximity to the optical waveguide 102. The ground rail 111 may be composed of sections that are disposed on the dielectric BCB layer. These sections may be operatively coupled to the underlying cathode electrodes 106A through via holes 114 in the BCB layer, forming a continuous ground rail along the length of the device.

FIGS. 3A-3B illustrates a partial cross-sectional view of the example CD-TWEAM device 100 shown in FIG. 1, in accordance with an embodiment of the invention. As shown in FIGS. 3A-3B, the CD-TWEAM device 100 may be grown on an SI InP substrate 105, starting with a doped n-InP layer 124 followed by the waveguide MQW core layers 126 and p-type cladding and contact layers 128 and 130, respectively, forming the p-i-n diode junctions of the waveguide. In some embodiments, the CD-TWEAM device 100 may include an epitaxial regrowth of SI InP layers 132 on both sides of the MQW waveguide core layers 126, to form a buried heterostructure (BH) waveguide. The various processes, procedures, and/or operations for fabricating embodiments of an exemplary EAM device with a BH waveguide may be performed using conventional methods, portions of which are disclosed in Tamura, M. (2003), "High-speed electroabsorption modulators using ruthenium-doped SI-InP: impact of interdiffusion-free burying technology on E/O modulation characteristics," International Conference on Indium Phosphide and Related Materials, 2003. pp. 491-494, the contents of which are incorporated herein by reference. In addition, the various processes, procedures, and/or operations for fabricating embodiments of an exemplary EAM device with a BH waveguide may be performed using conventional methods, portions of which is disclosed in Nakai, Y. (2019), "Uncooled Operation of 53-GBd PAM4 (106-Gb/s) EA/DFB Lasers With Extremely Low Drive Voltage With 0.9 $V_{pp}$," Journal of Lightwave Technology, Vol. 37, Issue 7, pp. 1658-1662, the contents of which are incorporated herein by reference.

FIG. 3A illustrates a partial cross-sectional view of the example CD-TWEAM device 100 shown in FIG. 1 along a second subset of diode segments 104B. As shown in FIG. 3A, in some embodiments, the first transmission line rail 110A and the second transmission line rail 110B may be disposed on an organic material 122 having a low dielectric constant (e.g., benzocyclobutene (BCB)). The first electrodes 106B (e.g., cathodes) of each diode segment in the second subset of diode segments 104B may be operatively coupled to the underlying conductive n-type InP layer 124, forming a part of the ground rail 111 of FIG. 1. The second electrodes 106A (e.g., anodes) of each diode segment in the second subset of diode segments 104B may be operatively coupled to the second transmission line rail 110B using metal traces 112B.

FIG. 3B illustrates a partial cross-sectional view of the example CD-TWEAM device 100 shown in FIG. 1 along a first subset of diode segments 104A. As shown in FIG. 3B, in some embodiments, the first transmission line rail 110A, the second transmission line rail 110B, and the ground rail 111 may be disposed on an organic material 122 having a low dielectric constant (e.g., BCB). The first electrodes 106B (e.g., cathodes) of each diode segment in the first subset of diode segments 104A may be operatively coupled to the first transmission line rail 110A using metal traces 112A. The second electrodes 106A (e.g., anodes) of each diode segment in the first subset of diode segments 104A may be operatively coupled to the ground rail 111, which is located above the BCB layer 122 in this region.

In example embodiments, the ground rail 111 (as seen in FIG. 3B) may be operatively coupled to the first electrode 106B of subsequent diode segments (106B in FIG. 3A), through designated via holes in the BCB layer (114 in FIG. 2) situated between the active segments. The second electrodes 106A (e.g., anodes) of these diode segments may be effectively isolated along the optical waveguide using standard treatments on the p-type layers 130 and 128 located in the passive gaps. Such treatments may include techniques like H2 ion plasma passivation, ion implantation, partial etching, or similar methods, resulting in the creation of high resistance p-type material in the spaces between the diode segments and in the separation between the CD-TWEAM device and the laser section for EML fabrication. Similarly, the first electrodes 106B (e.g., cathodes) may be effectively isolated along the optical waveguide by employing conducting n-type pockets (116 in FIG. 2). These pockets are shaped as insulated areas of n-type InP material dispersed on a flat SI InP substrate at the initial stages of the EAM/EML fabrication process, further detailed in relation to FIG. 6. Some of the processes, procedures, and/or operations for fabricating embodiments of an exemplary EAM device may be performed using conventional methods, portions of which are disclosed in application Ser. No. 17/810,068, titled, "HIGH BANDWIDTH TRAVELLING WAVE ELECTRO ABSORPTION MODULATOR (EAM) CHIP," the contents of which are incorporated herein by reference.

FIG. 4 illustrates a CD-TWEAM device operatively coupled to a differential RF source 202, in accordance with an embodiment of the invention. As shown in FIG. 4, the CD-TWEAM device 100 may be operatively coupled to an RF source 202. As described herein, the RF source 202 may be a SerDes transmitter that is configured to operate in a differential signaling mode. In differential signaling mode, the RF source 202 may include two complementary voltage signals 204A and 204B that are transmitted via a pair of conductors 206A and 206B, which may form a differential transmission line on a dielectric substrate carrier. The pair of conductors 206A and 206B may carry voltage signals that are equal in magnitude, but of opposite polarity. The pair of conductors 206A and 206B may be operatively coupled to an input end 100A of the CD-TWEAM device 100 via DC blocking capacitors 207A and 207B. In this regard, a first conductor 206A may be operatively coupled to the first transmission line rail 110A via a DC blocking capacitor 207A, and a second conductor 206B may be operatively coupled to the second transmission line rail 110B via a DC blocking capacitor 207B. In some embodiments, the DC blocking capacitors 207A and 207B may be implemented between the RF source and the CD-TWEAM device 100 to separate the RF source from the modulator DC bias sources.

In some embodiments, the output end 100B of the CD-TWEAM device 100 may be operatively coupled to a termination load. In this regard, as shown in FIG. 4, the first transmission line rail 110A may be operatively coupled to a first termination load L_A 208A, and the second transmission line rail 110B may be operatively coupled to a second termination load L_B 208B. The first termination load L_A 208A may be operatively coupled to ground via a capacitor 211A. Similarly, the second termination load L_B 208B may be operatively coupled to ground via a capacitor 211B.

In some embodiments, each termination load may be operatively coupled to a biasing circuit. In an example embodiment, as shown in FIG. 4, the end of the first termination load L_A 208A may be operatively coupled to biasing element 210A and the end of the second termination load L_B 208B may be operatively coupled to biasing element 210B. The biasing elements 210A and 210B may be operatively coupled to a DC bias source DCBS_A and DCBS_B, respectively. In some embodiments, the biasing elements 210A and 210B may be inductors or electrical circuits that include inductors. By using this biasing scheme, any direct current (DC) to ground may be eliminated by the capacitors 211A and 211B, thus reducing power consumption.

FIG. 5A illustrates a simulated frequency response curve 500 for a single-ended lumped element EAM device with an active modulator length of 80 microns driven by a single ended RF source. In this simulation the single ended source impedance Zs was 50Ω, and the termination load was 50Ω. Here, the single-ended lumped element EAM device is mounted on a ceramic carrier with wire bonds that connect the EAM device to two distinct points, the input source and output termination. As evident from the frequency response curve, with active length of 80 microns, the EAM device achieves an operational bandwidth of 78 GHz.

FIG. 5B illustrates a simulated frequency response curve 550 for a CD-TWEAM device with four electrode segments, with each electrode segment having an active modulator length La of 20 microns, in accordance with an embodiment of the invention. Specifically, a frequency response curve of a CD-TWEAM device with a segment length La of 20 microns, total number of segments n equal to 4, source impedance Zs of 86Ω, and two termination loads L_A and L_B (as shown in FIG. 4) of 38Ω each. The total active length of the CD-TWEAM device is 80 microns (same as that of the single-ended lumped element device of FIG. 5A). The CD-TWEAM device may be driven by a differential SerDes transmitter that provides a driving voltage, $V_{pp}$~IV, at full swing. As evident from the frequency response curve, the CD-TWEAM device achieves an operational bandwidth of 148 GHz—a significant improvement compared to the single-ended lumped element EAM device used in FIG. 5A. Furthermore, the overall length of the CD-TWEAM 100 is about 200 microns, which is significantly shorter than other TWEAM designs. This demonstrates the advantages of the invention in comparison to other conventional solutions.

At present, a majority of EMLs are constructed on n-type InP substrates. In devices built on these substrates, both the cathodes of the EAM and the laser have their electrical connections directly linked to the substrate. Therefore, these connections inherently share a common ground and restrict designs where cathodes and anodes of different diode segments are electrically isolated. This limitation further prevents these segments from being linked to signal sources of different polarities. To remedy this issue, embodiments of the present invention implement EAMs and EMLs on SI substrates. These SI substrates are further processed to create special planar substrates with different interspersed regions of electrically isolated n-type pockets, which serve as the isolated cathodes for various EAM segments. In example embodiments, the n-type pockets are surrounded by a semi-insulating material, resulting in a flat substrate characterized by specific conducting and insulating regions. After preparing the special planar substrate, the EAM or EML device can be constructed atop it, employing traditional designs and methodologies, similar to the current practices on planar n-type substrates.

FIG. 6A illustrates an example formation 600 of isolated pockets of conducting n-type material 402 in a planar SI substrate using selective ion implantation of n-type dopant (e.g. silicon) inside the semi-insulating (SI) InP layer 401, in accordance with an embodiment of the invention. In an example embodiment, isolated pockets of conducting n-type semiconductor layers may be formed on a SI substrate 105 by modifying the electrical properties of specific regions of the substrate 105 using a selective implantation process.

FIG. 6B illustrates an example formation 620 of isolated regions of conducting n-type semiconductor layers in a planar SI substrate 105 using selective implantation of isolation promoting ions, in accordance with an embodiment of the invention. The method of using ion implantation as a means to create isolation in semiconductor materials is well documented. For further details, reference can be made to the work of P. Too et al, entitled "Implant isolation of both n-type InP and InGaAs by iron irradiation: effect of post-implant annealing temperature," presented at The 11th IEEE International Symposium on Electron Devices for Micro-wave and Optoelectronic Applications (IEEE Cat. No. 03TH8691)."

In accordance with an embodiment of the invention, isolated pockets of conducting n-type semiconductor layers may be formed on a SI substrate 105 by growing an epitaxial layer of doped n InP 401, which is then subjected to a selective iron (Fe) ion implantation, guided by a durable mask (e.g., constructed from SiN), to form isolated Fe implanted isolation regions 406. Following the implantation, an annealing process is applied to mitigate some of the damage that may have incurred. This sequence of actions produces a planar surface embedded with isolated conduct-ing n-InP regions 401, primed for subsequent standard processes intended for the creation or integration of the EAM. Distinct from the previously described method in FIG. 6A, in this approach, the areas implanted with Fe function as the passive sections of the device, positioned between the active sections.

FIG. 6C illustrates an example formation 640 of isolated pockets of conducting n-type semiconductor layers in a planar semi-insulating substrate using epitaxial regrowth of the n-type InP layer inside chemically etched wells in the planar SI InP layer 403, in accordance with an embodiment of the invention. In an example embodiment, isolated pock-ets of conducting n-type semiconductor layers may be formed on a semi-insulating substrate layer 403 using epi-taxial regrowth of n InP layer inside chemically etched pockets 405 in the SI substrate layer 403. This method yields a planar surface interspersed with discrete n InP pockets 410, which are then primed for subsequent standard processes intended for the creation or integration of the EAM.

FIG. 6D illustrates an example formation 660 of isolated pockets of conducting n-type semiconductor layers in a planar SI substrate using epitaxial regrowth of a semi-insulating InP layer inside chemically etched wells in an n-type InP layer grown on the planar semi-insulating sub-strate, in accordance with an embodiment of the invention. In an example embodiment, isolated pockets of conducting n-type semiconductor layers may be formed on an SI substrate 105 using epitaxial growth of a planar highly doped n InP layer 403 on SI substrate 105. Once this layer 403 is established, a subsequent step involves the chemical etching process to form chemically etched wells 407. Here, the wells 407 are etched, penetrating entirely through the previously grown n InP layer 403. Following this etching, there is a need to restore the created wells 407 to ensure a planar continuous surface. This restoration is accomplished through the epitaxial regrowth of a semi-insulating InP material 416, effectively refilling the etched areas and pro-viding a suitable foundation for subsequent device pro-cesses.

Example Methods for Generating an Optical Output Signal Using an EAM Device

FIG. 7 illustrates a method 700 for generating an optical output signal using a CD-TWEAM device, in accordance with an embodiment of the invention. As shown in block 702, the method 700 may include receiving, from a laser source, a continuous wave (CW) light via an optical wave-guide, wherein the optical waveguide comprises a seg-mented structure comprising diode segments disposed thereon.

In some embodiments, the EAM device (e.g., CD-TWEAM device 100) may be monolithically integrated along with the laser source and formed on a chip (e.g., on and/or comprising a substrate) so as to provide an integrated laser-modulator chip. In one aspect, the laser source may be configured to generate a continuous wave (CW) light and/or laser beam and cause the continuous wave (CW) light and/or laser beam to propagate through the optical waveguide associated with the CD-TWEAM device. As described herein, the optical waveguide may include alternating active sections and passive sections, where modulation of the CW laser light primarily occurs in the active sections. Each diode segment may be disposed on a corresponding active section of the optical waveguide.

As shown in block 704, the method may include receiv-ing, from a radio frequency (RF) source, an electrical signal via an electrical transmission line, wherein the electrical transmission line comprises a first transmission line rail and a second transmission line rail, wherein a first subset of diode segments is operatively coupled to the first transmis-sion line rail and a ground rail, and a second subset of diode segments is operatively coupled to the second transmission line rail and the ground rail. In various embodiments, the RF source may be any signal generator that has a differential output stage. The electrical signal supplied by the RF source may be efficiently provided to the electrode segments via the electrical transmission line. In an example embodiment, the electrical transmission line may be composed of three rails in a signal-ground-signal (SGS) configuration. As described herein, the first subset of diode segments and the second subset of diode segments may be disposed on the active section of the optical waveguide along the electrical trans-mission line.

As shown in block 706, the method may include gener-ating an optical output signal based on at least modulating the CW light. In some embodiments, the EAM device may be configured to modulate the continuous wave (CW) light as it propagates through the optical waveguide to encode and/or embed an information signal thereon.

As shown in block 708, the method includes transmitting the optical output signal via the optical waveguide to an external optical fiber. In some embodiments, the CW light having an information signal encoded and/or embedded thereon may be transmitted to an optical fiber, free space optics, an external destination such as an optical fiber, optical transceiver and/or receiver, and/or the like.

Many modifications and other embodiments of the present disclosure set forth herein will come to mind to one skilled in the art to which these embodiments pertain having the benefit of the teachings presented in the foregoing descrip-tions and the associated drawings. Although the figures only show certain components of the methods and systems described herein, it is understood that various other compo-nents may also be part of the disclosures herein. In addition, the method described above may include fewer steps in some cases, while in other cases may include additional steps. Modifications to the steps of the method described above, in some cases, may be performed in any order and in any combination, and in some cases one or more steps may be performed at substantially the same time.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An electro-absorption modulator (EAM) device comprising:
    an optical waveguide comprising a waveguide core configured to facilitate propagation and modulation of an optical signal therethrough;
    a segmented structure comprising diode segments disposed on the waveguide; and
    an electrical transmission line operatively coupled to the diode segments, wherein the electrical transmission line is configured to facilitate propagation of an electrical signal therethrough, wherein the electrical transmission line comprises a first transmission line rail and a second transmission line rail, wherein a first subset of diode segments is operatively coupled to the first transmission line rail and a ground rail, and a second subset of diode segments is operatively coupled to the second transmission line rail and the ground rail,
    wherein the diode segments from the first subset are disposed alternately with the diode segments from the second subset.

2. The EAM device of claim 1, wherein the electrical transmission line is a differential electrical transmission line.

3. The EAM device of claim 2, wherein an impedance associated with the differential electrical transmission line, when unloaded, is within a range of approximately 80 Ω to approximately 150Ω.

4. The EAM device of claim 1, wherein the electrical transmission line is a co-planar dual strip-line (CPS) transmission line.

5. The EAM device of claim 4, wherein the CPS transmission line has at least one of (i) a signal-ground-signal (SGS) configuration, (ii) a ground-signal-signal-ground (GSSG) configuration, or (iii) a ground-signal-ground-signal-ground (GSGSG) configuration.

6. The EAM device of claim 1, wherein the EAM device is formed on a planar semi-insulating substrate.

7. The EAM device of claim 6, wherein the planar semi-insulating substrate comprises a plurality of isolated pockets of conducting n-type semiconductor layers.

8. The EAM device of claim 7, wherein the plurality of isolated pockets of conducting n-type semiconductor layers in the planar semi-insulating substrate are formed by at least one of (i) selective implantation of donor ions in the planar semi-insulating substrate, (ii) selective implantation of insulation promoting ions (such as Fe ions) in an epitaxial n-type Indium Phosphide (InP) layer, (iii) epitaxial regrowth of the n-type InP layer inside che mically etched wells in the planar semi-insulating substrate, or (iv) epitaxial regrowth of a semi-insulating InP layer inside chemically etched wells in an n-type InP layer grown on the planar semi-insulating substrate.

9. The EAM device of claim 1, wherein the optical waveguide comprises at least one of a ridge waveguide or a buried heterostructure (BH) waveguide.

10. The EAM device of claim 1, wherein the first transmission line rail is operatively coupled to a first electrode of each diode segment in the first subset of diode segments, and the second transmission line rail is operatively coupled to a second electrode of each diode segment in the second subset of diode segments.

11. The EAM device of claim 1, wherein the ground rail is disposed between the first transmission line rail and the second transmission line rail.

12. The EAM device of claim 1, wherein an output end of the electrical transmission line is operatively coupled to a termination load.

13. The EAM device of claim 1, wherein the first transmission line rail is disposed along a first side of the waveguide core, and the second transmission line rail is disposed along a second side of the waveguide core.

14. The EAM device of claim 1, wherein the diode segments are disposed on the optical waveguide along the electrical transmission line and are configured to create discrete capacitive loads on the electrical transmission line.

15. The EAM device of claim 1, wherein the EAM device is configured for operation by a radio frequency (RF) source, wherein the RF source is configured to supply the electrical signal to the EAM device.

16. The EAM device of claim 15, wherein the RF source is directly coupled to an input end of the electrical transmission line without an intermediate single-ended driver circuit.

17. The EAM device of claim 15, wherein the RF source is a differential signal source comprising a differential signal port, wherein the differential signal port is operatively coupled to an input end of the electrical transmission line.

18. The EAM device of claim 15, wherein the RF source is a Serializer-Deserializer (SerDes) transmitter.

19. The EAM device of claim 1, wherein the optical waveguide comprises alternating active sections and passive sections, wherein each diode segment is disposed on a corresponding active section.

20. The EAM device of claim 19, wherein the waveguide core comprises a continuous multi-quantum well (MQW) layer stack, wherein portions of the MQW layer stack disposed in the active sections have an energy gap defining an active energy gap value, and portions of the MQW layer stack disposed in the passive sections have an energy gap defining a passive energy gap value, wherein the passive energy gap value is greater than or equal to the active energy gap value to maintain low insertion loss.

21. The EAM device of claim 1, wherein the EAM device is monolithically integrated with a laser source on a same chip.

22. The EAM device of claim 1, wherein the diode segments and the electrical transmission line are configured to provide velocity matching between the electrical signal and the optical signal.

23. A method of generating an optical output signal using an electro-absorption modulator (EAM) device, the method comprising:
    receiving, from a laser source, a continuous wave (CW) light via an optical waveguide, wherein the optical waveguide comprises a segmented structure comprising diode segments disposed thereon;
    receiving, from a radio frequency (RF) source, an electrical signal via an electrical transmission line, wherein the electrical transmission line comprises a first transmission line rail and a second transmission line rail, wherein a first subset of diode segments is operatively coupled to the first transmission line rail and a ground rail, and a second subset of diode segments is operatively coupled to the second transmission line rail and the ground rail;

generating, using the EAM device, an optical output signal based on at least modulating the CW light; and transmitting the optical output signal via the optical waveguide to an external optical fiber.

24. The method of claim 23, wherein the diode segments from the first subset are disposed alternately with the diode segments from the second subset.

* * * * *